US008216688B2

(12) United States Patent
Yamaguchi

(10) Patent No.: US 8,216,688 B2
(45) Date of Patent: Jul. 10, 2012

(54) DYEING METHOD OF ALUMINUM-BASED MEMBER, AND ALUMINUM-BASED MEMBER

(75) Inventor: Masao Yamaguchi, Kanagawa (JP)

(73) Assignee: Corona Kogyo Corporation, Tokyo (JP)

( * ) Notice: Subject to any disclaimer, the term of this patent is extended or adjusted under 35 U.S.C. 154(b) by 0 days.

(21) Appl. No.: 13/050,331

(22) Filed: Mar. 17, 2011

(65) Prior Publication Data

US 2011/0165391 A1 Jul. 7, 2011

Related U.S. Application Data

(62) Division of application No. 12/344,875, filed on Dec. 29, 2008, now Pat. No. 7,931,939.

(30) Foreign Application Priority Data

Dec. 28, 2007 (JP) ................................ 2007-340217

(51) Int. Cl.
*B32B 9/00* (2006.01)

(52) U.S. Cl. .................... 428/469; 8/685; 8/686; 8/687; 8/692; 8/693; 204/508; 204/510; 205/202; 205/333; 148/244

(58) Field of Classification Search .................. 428/469; 8/685, 686, 687, 692, 693; 204/508, 510; 205/202, 333; 148/244
See application file for complete search history.

(56) References Cited

U.S. PATENT DOCUMENTS

| | | | |
|---|---|---|---|
| 3,079,309 | A | 2/1963 | Wainer |
| 3,242,037 | A | 3/1966 | Howe |
| D581,922 | S | 12/2008 | Andre et al. |
| 2004/0161614 | A1 | 8/2004 | Athey et al. |
| 2007/0028402 | A1 | 2/2007 | Matsuoka |

FOREIGN PATENT DOCUMENTS

| | | |
|---|---|---|
| JP | 2007-39757 A | 2/2007 |

*Primary Examiner* — Frederick Parker
*Assistant Examiner* — Xiao Zhao
(74) *Attorney, Agent, or Firm* — Westerman, Hattori, Daniels & Adrian, LLP

(57) ABSTRACT

In a dyeing method of an aluminum-based member, a first color forming material is held in a hole of a first region of an anodized film, a second color forming material is held in holds of a second region that is smaller than the first region by diagonally spraying, When the second colored layer is formed, a gradation region is formed in a boundary with the first region and the second region, and the hole are closed.

4 Claims, 6 Drawing Sheets

DYEING METHOD OF ALUMINUM-BASED MEMBER, AND ALUMINUM-BASED MEMBER

CROSS-REFERENCE TO RELATED APPLICATIONS

This application is a divisional of U.S. application Ser. No. 12/344,875, now U.S. Pat. No. 7,931,939, filed on Dec. 29, 2008, which is based upon and claims the benefit of priority from the prior Japanese Patent Application No. 2007-340217, filed on Dec. 28, 2007, the entire contents of which are incorporated herein by reference

BACKGROUND OF THE INVENTION

The present invention relates to a dyeing method of an aluminum-based member, and an aluminum-based member.

When an aluminum-based member is decorated by coloring, an organic dyestuff is adsorbed into a hole of an anodized film formed on a surface of an aluminum-based raw material. Further, metal or metal compound is deposited in the hole of the anodized film.

When an aluminum-based member is colored with an organic dyestuff, an aluminum-based member is soaked in a solution in which the organic dyestuff is dissolved.

When an aluminum-based member is colored with metal or metal compound, the aluminum-based member is soaked in a solution in which metal ion or metal compound ion is dissolved. Voltage is then applied to the aluminum member and is colored electrolytically.

According to these methods, the aluminum member is equally colored, and there is formed a clear metallic tone having texture of an aluminum raw material, which is the ground.

If an aluminum-based member is partially soaked in a solution including another organic dyestuff after the aluminum-based member is colored, the surface of the aluminum-based raw material can be colored in two colors. A technique for blurring a colored boundary, so-called a gradation technique is disclosed in Japanese Patent Application Laid-open No. 2007-39457. That is, a portion of the colored aluminum-based member is soaked in a decolorizer solution. If a contact time between the decolorizer solution and a surface of the aluminum-based member is varied, decoloration degrees of a surface of the aluminum-based member become different. This difference becomes the continuous gradation. If a decolorizer solution is sprayed to the colored aluminum-based member by a spray gun, a decoloration degree is varied depending on an adhesion distribution of the sprayed decolorizer solution, and gradation is created.

SUMMARY OF THE INVENTION

An aspect of the present invention provides a dyeing method of an aluminum-based member, comprising: a first coloring step of holding a first color forming material in a hole of an anodized film constituting an aluminum-based member, to dye a first region of the aluminum-based member, a second coloring step of diagonally spraying a second color forming material to the hole and holding the second color forming material after the first coloring step to dye a second region that is smaller than the first region, and forming a gradation from the second color to the first color in a boundary with respect to a portion where the first region is exposed at an edge of the second region and a hole-closing step of closing the hole after the second coloring step.

Another aspect the present invention provides an aluminum-based member comprising: a first colored layer formed by holding a first color forming material in a hole of an anodized film constituting an aluminum-based member to dye a first region of the aluminum-based member, a second colored layer formed by diagonally spraying a second color forming material that is different from the first color forming material from the first colored layer, and holding the second color forming material, the second colored layer being formed in a second region that is smaller than the first region, and a gradation region from the second color to the first color in a boundary with respect to a portion where the first region is exposed at an edge of the second region, and is formed when the second colored layer is formed.

DETAILED DESCRIPTION OF THE PREFERRED EMBODIMENTS

Preferred embodiments of the present invention will be explained below in detail with reference to the accompanying drawings.

Figure 1:
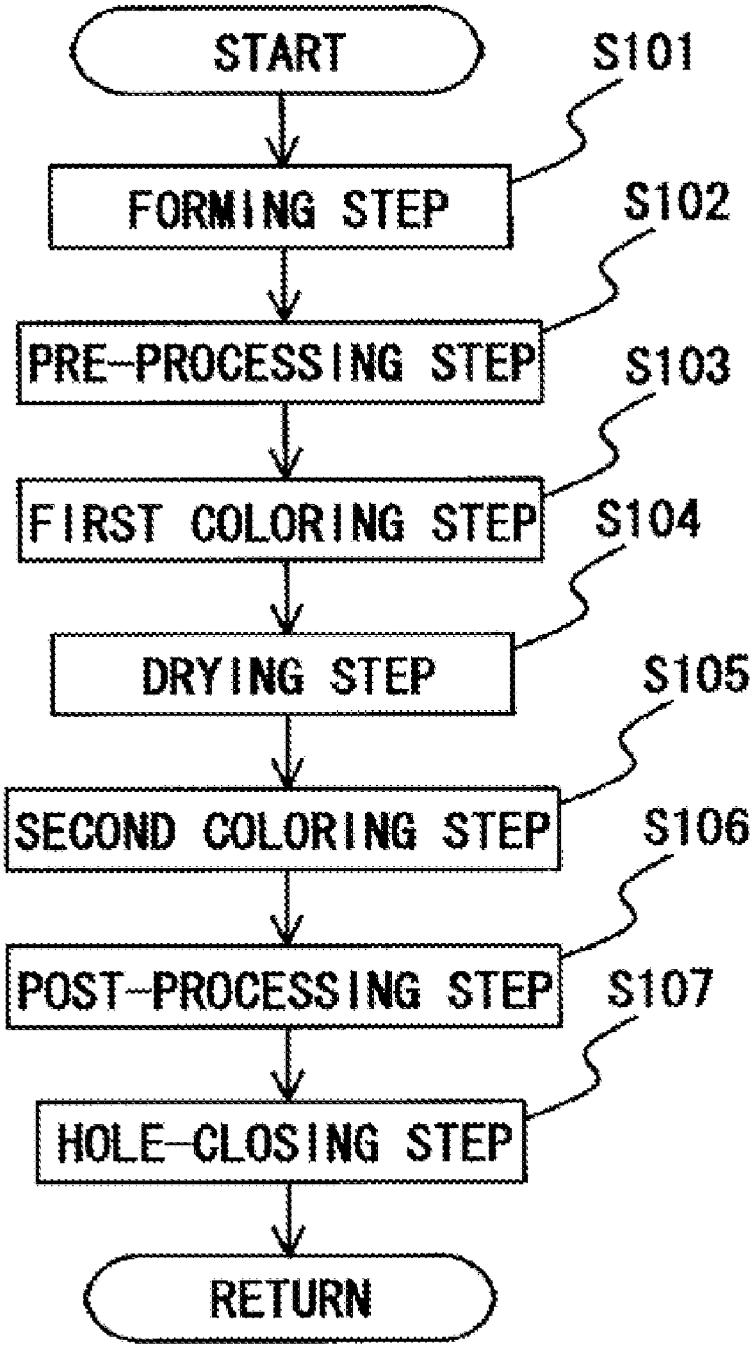
FIG. 1 is a flowchart of a producing method of an aluminum-based member according to an embodiment of the present invention.

FIG. 1 is a flowchart of a producing method of an aluminum-based member. In production of an aluminum-based member, a forming step (step S101) of an aluminum-based member is performed first, and a pre-processing step (step S102) and an anodic oxidation step (step S103) are then performed. Further, a first coloring step (step S104) is performed and a drying step (step S105) is then performed. Subsequently, a second coloring step (step S106) is performed, and a post-processing step (step S107) and a closing step (step S108) are then performed.

In the forming step in step S101, an aluminum-based raw material is cut into a necessary size or pressed. With this process, an aluminum-based member is produced. Examples of the aluminum-based raw material are aluminum or aluminum alloy. Examples of the aluminum alloy are pure aluminum-based alloy, Al—Si-based alloy, Al—Mg-based alloy, Al—Cu-based alloy, and Al—Zn-based alloy. The aluminum-based member is used for a casing or an ornamental part (exterior part) of electric devices, electronic information devices, vehicles, building materials and the like, but utilizations thereof are not limited. Instead of performing the forming step in step S101, or in addition to performing step S101, the forming step can be performed at other timings. In this case, the forming step is performed at least once between step S102 and step S108, or after step S108.

The pre-processing step in step S102 is performed by a known mechanical method or a chemical method according to a surface condition. With this process, the aluminum-based raw material is calendered, burnished, degreased, or satin finished by polishing. Further, flaws are removed from the aluminum-based raw material and the surface thereof is flattened according to its use.

In the anodic oxidation step in step S103, an aluminum-based member is electrically connected to an anode, then soaked in a bath in which electrolytic solution is stored. An example of the electrolytic solution is dilute sulfuric acid. A portion of the aluminum-based member that is colored later is entirely soaked. If direct voltage is applied between the aluminum-based member and an cathode inserted into the bath, a clear colorless anodized film is formed on a surface of the aluminum-based member.

Figure 2:
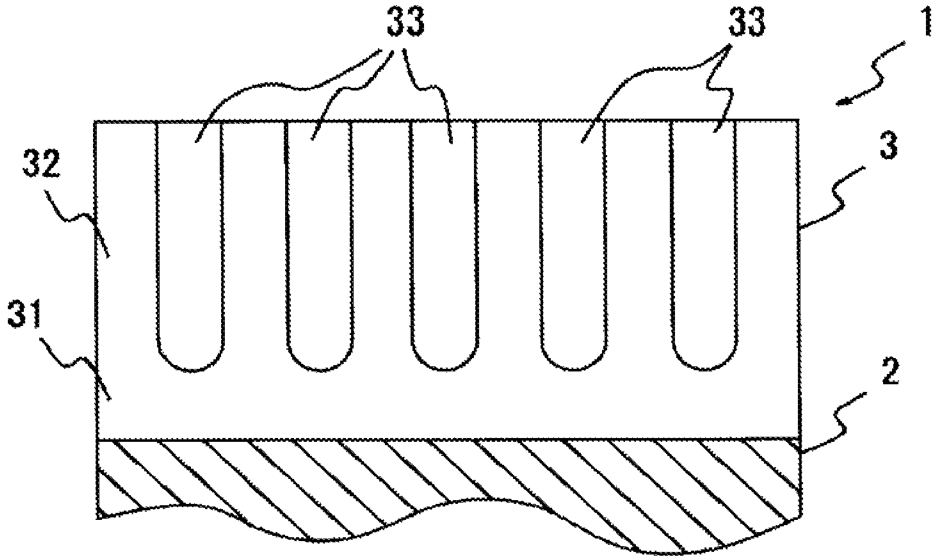
FIG. 2 is a schematic sectional view of an aluminum-based member formed with an anodized film.

FIG. 2 is a schematic sectional view of an aluminum-based member formed with an anodized film. An aluminum-based member 1 has an anodized film 3 on a surface of an aluminum-based raw material 2. The anodized film 3 is made of an aluminum oxide, and includes a barrier layer 31 closer to the surface of the aluminum-based raw material 2, and a porous layer 32 formed on the barrier layer 31. A large number of holes 33 are arranged in the porous layer 32 substantially in parallel to the anodized film 3. Tip ends of the holes 33 are opened. A thickness of the anodized film 3 is several μm to 20 to 30 μm, and a diameter of the hole 33 is about 0.01 μm.

Figure 3:
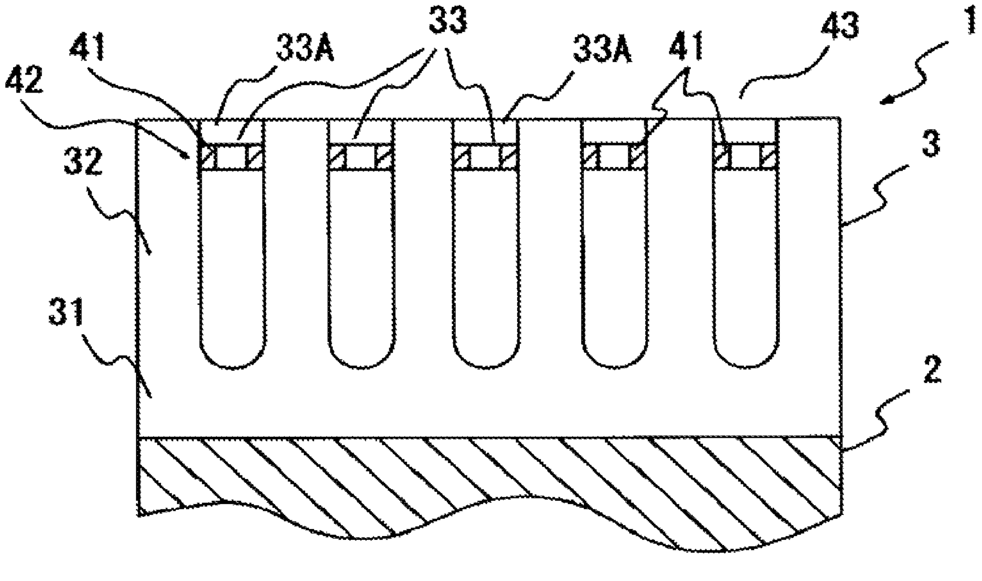
FIG. 3 is a schematic sectional view of the aluminum-based member on which a first colored layer is formed by an organic dyestuff.

In the first coloring step in step S104, a surface of the aluminum-based member 1 formed with the anodized film 3 is dyed equally with a first color forming material. When the first color forming material is organic dyestuff, organic dyestuff is dissolved in pure water heated to 50 to 60° C. to form dyeing liquid, and the aluminum-based member 1 is soaked in the dyeing liquid. The dyeing liquid penetrates the anodized film 3, and the organic dyestuff is held on an inner wall surface of the hole 33. As a result, as shown in FIG. 3, first colored layers 42 each including organic dyestuff 41 are formed near the tip end openings 33A of the holes 33. The first colored layer 42 is uniformly formed in all of the holes 33 of the anodized film 3 soaked in the dyeing liquid. That is, a region where the first colored layer 42 is formed is the entire surface of the anodized film 3. This region is called a first region 43.

In the aluminum-based member 1, the metal texture is held on the surface of the aluminum-based member 1 on which the anodized film 3 is formed, and an interference color is uniformly formed by the first colored layer 42.)

The same first colored layer 42 as that shown in FIG. 3 is also formed when dyeing liquid is equally sprayed over the entire surface of the anodized film 3 using a spray gun. In this case, if the spray gun is controlled by a computer, the first colored layer 42 can be equally formed without generating uneven portions.

Further, when the first color forming material is metal or metal compound, the aluminum-based member 1 is soaked in a solution (coloring liquid) including metal salt. For example, if ferric ammonium oxalate or sulfuric acid-based metal salt such copper, tin, zinc and nickel is used, an interference color such as gold, bronze, sorrel, and gray is obtained respectively. When the member 1 is colored with gold using ferric ammonium oxalate, the member 1 can be colored only by soaking the aluminum-based member 1 in the coloring liquid. When the aluminum-based member 1 is to be colored with a different color, alternating voltage is applied to the aluminum-based member 1 soaked in the coloring liquid. Metal or metal compound is deposited on a bottom of the holes 33, and an interference color corresponding to a kind of the first color forming material is obtained. With this process, the metal texture of aluminum of the ground is held on the surface of the aluminum-based member 1 where the anodized film 3 is formed and in this state, a uniform interference color by the first colored layer 42 is formed over the entire first region 43.

In the drying step in step S105, organic dyestuff or metal salt adhered on the surface of the anodized film 3 are washed out. Thereafter, the aluminum-based member 1 is dried. The holes 33 are not closed in this stage.

In the second coloring step in step S106, organic dyestuff as the second color forming material is sprayed to the aluminum-based member 1 by a spray gun, and the second colored layer is formed. The organic dyestuff is dissolved in an organic solvent and supplied to the spray gun in this state. The second organic dyestuff used here preferably has a color different from that of the first color forming material.

Figure 4:
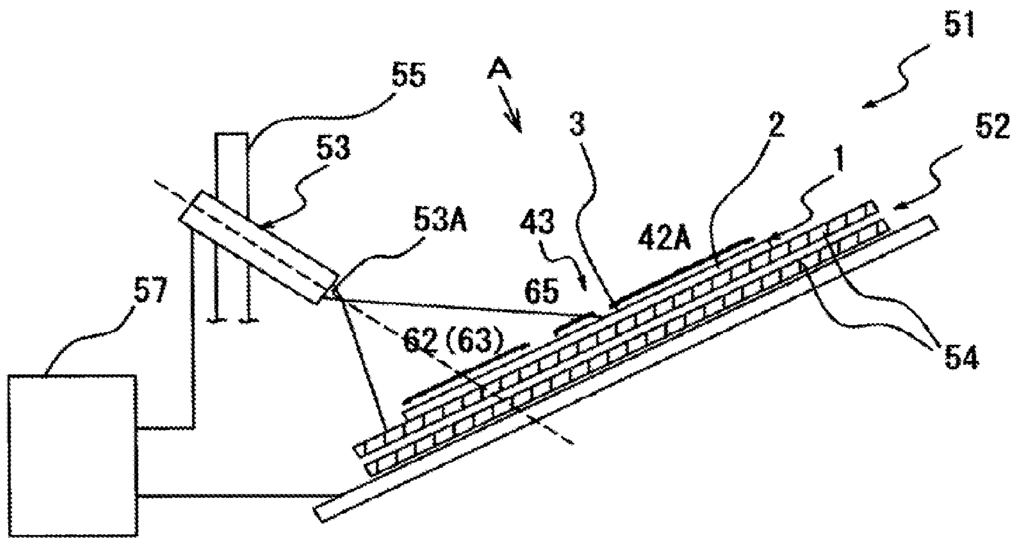
FIG. 4 shows a configuration outline of a coloring apparatus.

One example of an apparatus configuration for performing the second coloring step is shown in FIG. 4. A coloring apparatus 51 includes a conveying device 52 in which the aluminum-based member 1 is placed and conveyed such that the anodized film 3 faces up. Further, a spray gun 53 is provided to be opposed to the conveying device 52. The conveying device 52 is illustrated as a belt conveyer having a belt 54 capable of conveying a plurality of aluminum-based members 1; however, other apparatuses can be also used. Examples of other apparatuses include a palette type conveyer and a jointed-arm robot having a hand that holds the aluminum-based member 1. It is preferable that the conveying device 52 has the aluminum-based member 1 positioned diagonally so that an unintended portion is not colored due to dripping of organic dyestuff and a portion to be colored comes underneath. The aluminum-based member 1 can be raised upright. The aluminum-based member 1 can be positioned substantially horizontally only if dripping does not occur. The spray gun 53 is held by an arm 55 such that the axis of the nozzle 53A has a predetermined angle of inclination for an aluminum-based member 1 positioned in the conveying device 52.

According to the coloring apparatus 51, organic dyestuff is sufficiently sprayed to one end side of the aluminum-based member 1 positioned underneath. With this process, the organic dyestuff is held on an inner wall surface of the opened holes 33 and a second colored layer 62 is formed.

The second colored layer 62 is formed such as to cover the first colored layer 42. The axis of the nozzle 53A of the spray gun 53 passes underneath (one end) from the center of the aluminum-based member 1, the organic dyestuff does not reach upper end (opposite side) of the aluminum-based member 1. Therefore, on upper end, the second colored layer 62 is not formed and the interference color by the first colored layer 42 is maintained. That is, a second region 63 where the second colored layer 62 is formed is smaller than the first region 43 where the first colored layer 42 is formed.

Figure 5:
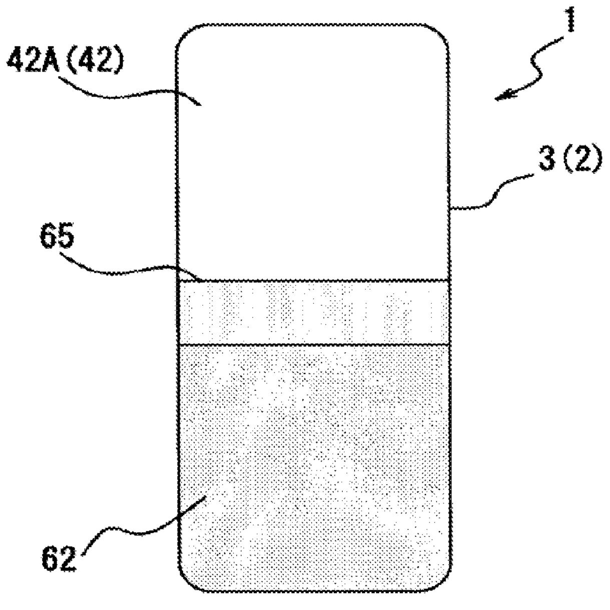
FIG. 5 shows an external appearance of the aluminum-based member taken along an arrow A in FIG. 4.

As shown in FIG. 5, an edge of the second colored layer 62 that is a boundary with respect to a portion 42A exposed to the first colored layer 42 becomes a gradation region 65. In a gradation region 65, the interference color by the second colored layer 62 is reduced and the interference color by the first colored layer 42 is gradually exposed. Because on the upper end of the second colored layer 62, the amount of sprayed organic dyestuff is reduced as a distance from the spray gun increased, the thickness of the second colored layer 62 is gradually reduced. The gradation region 65 has a bandlike shape extending straightly in a direction that is substantially perpendicular to the long distance direction of the aluminum member 1.

Figure 6:
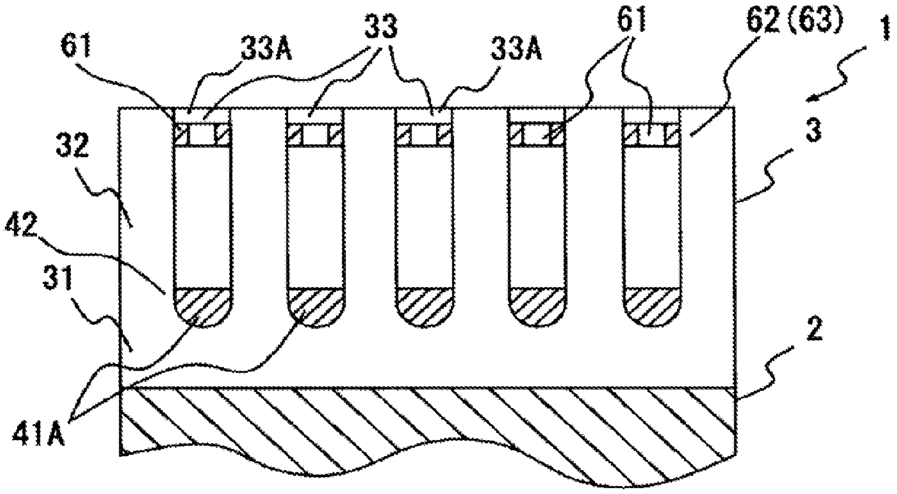
FIG. 6 is a schematic sectional view of a second colored layer taken along a line B-B in FIG. 5.

As shown in a schematic cross-section of FIG. 6, in the second region 63 on the one end side, organic dyestuff 61 sprayed from the spray gun 53 is substantially equally held near the opening 33A of the holes 33, and the second colored layer 62 having uniform thickness is formed. Note that FIG. 6 is simplified such that the configuration can be easily understood.

As explained above, metal salt 41A is used as the first color forming material to form the first colored layer 42. However, also when the first colored layer 42 is formed using the organic dyestuff 41, the first colored layer 42 and the second colored layer 62 are superposed in the film thickness direction.

Figure 7:
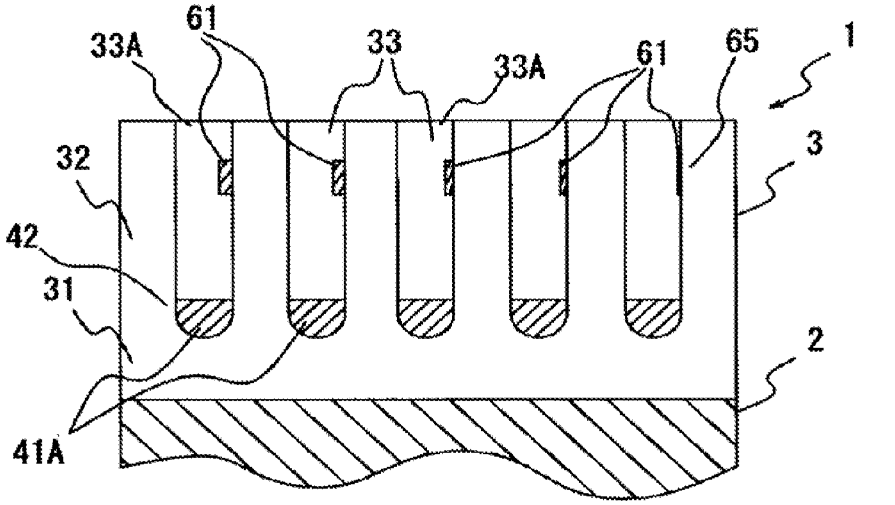
FIG. 7 is a schematic sectional view of a gradation region taken along a line C-C in FIG. 5.
Figure 8:
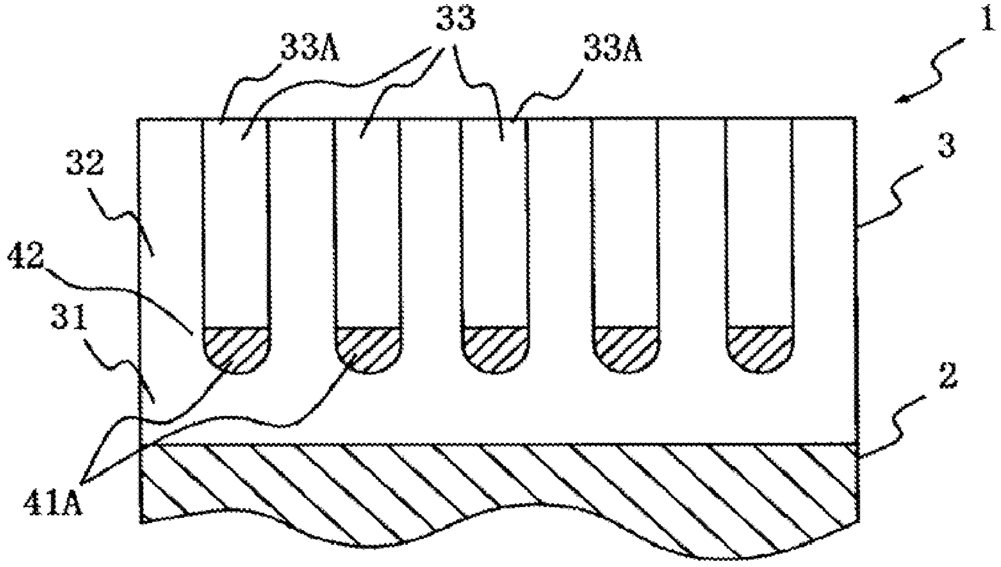
FIG. 8 is a schematic sectional view of the first colored layer taken along a line D-D in FIG. 5.

FIG. 7 is a schematic sectional view. As shown in FIG. 7, in the gradation region 65, the amount (or thickness) of the organic dyestuff 61 is reduced toward the other end from the one end. As shown in FIG. 8, in the portion 42A exposed on the one end side, only the first colored layer 42 exists.

A distance between the aluminum-based member 1 and the spray gun 53 and a spraying amount (a spraying time) of the organic dyestuff 61 are appropriately changed according to a forming position of the second colored layer 62 and a size thereof. For example, if the spray gun 53 is positioned near the aluminum-based member 1, the area of the second colored layer 62 is increased. If an angle formed between the axis of the nozzle 53A of the spray gun 53 and the surface of the aluminum-based member 1 is reduced, i.e., if the axis and the surface are brought closer to parallel, the gradation region 65 is increased and the color is gradual changed. On the other hand, if the angle formed between the axis of the nozzle 53A of the spray gun 53 and the surface of the aluminum-based member 1 is increased, i.e., if the axis and the surface are brought closer to vertical, the gradation region 65 is reduced. In the coloring apparatus 51, the conveying device 52 and the spray gun 53 are controlled by a computer 57, and thus stable coloring and desired external appearance can be obtained.

Figure 9:
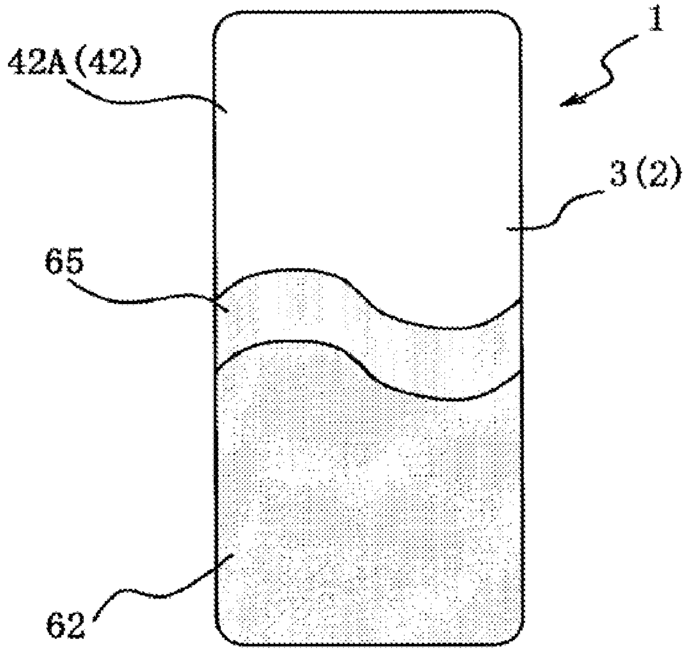
FIG. 9 shows an external appearance of the aluminum-based member.
Figure 10:
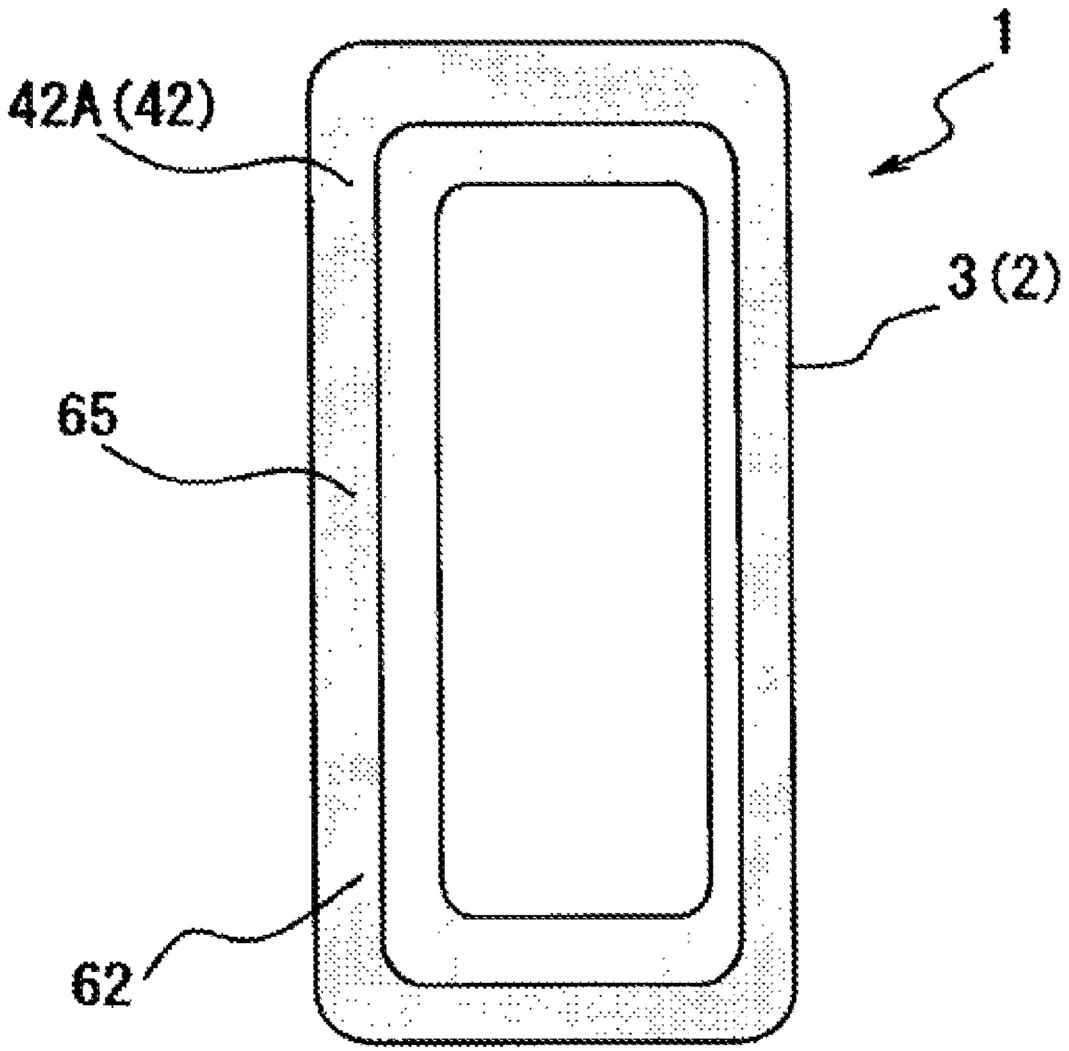
FIG. 10 shows the external appearance of the aluminum-based member.

The coloring apparatus 51 can have a plurality of spray guns 53. By spraying from the spray guns 53 from different positions, a boundary between the second colored layer 62 and the exposed portion 42A becomes straight or diagonal. If the spray guns 53 are mounted on a jointed-arm robot or the like, the spray guns 53 can move and various patterns can be formed. For example, if the spray gun 53 is moved in a wave form, the gradation region 65 can be formed into the wave form as shown in FIG. 9. If the spray gun 53 is moved along a peripheral edge of the aluminum-based member 1 as shown in FIG. 10, the second colored layer 62 can be formed in an outer peripheral edge of the aluminum-based member 1. The first colored layer 42 is exposed from the central portion and the gradation region 65 is formed substantially annularly.

In the post-processing step in step S107, the organic dyestuff 61 sprayed by the spray gun 53 and adhered on the surface of the anodized film 3 is washed out.

In the closing step in step S108, the aluminum-based member 1 is soaked in a solution in which nickel acetate is dissolved in water of 85° C. The opening 33A of the holes 33 swells and the holes 33 including the colored layers 42 and 62 therein is closed. With this process, the aluminum-based member 1 having the two colored layers 42 and 62 and gradation between them can be obtained while maintaining texture of metal of the aluminum-based raw material 2.

Even if the aluminum-based member 1 has the same colors and gradation, the external appearance can be changed by the calendar and roughness of the surface of the aluminum-based raw material 2, which is the ground of the anodized film 3.

According to the present embodiment, when the second colored layer 62 is formed, the organic dyestuff 61 is diagonally sprayed to the holes 33 of the aluminum-based member 1. Therefore, it is possible to easily form gradation between the second colored layer 62 and the first colored layer 42, i.e., the color is gradually changed. Compared with a case where gradation is formed while soaking the member in a solution, multiple colors sandwiching gradation can easily be obtained only by spraying the second color forming material, and the producing time can be shortened. Because a portion forming the second region 63 is positioned underneath in the second coloring step, liquid dripping is prevented when spraying the dyeing liquid including the second color forming material.

Further, as a pattern of the gradation, any arbitrary shape can be formed. According to conventional decolorizing methods, gradation can be formed by adjusting light and shade of one color, however, gradation using different colors cannot be formed. However, in the present embodiment, gradation can be formed between different colors.

An example of the present embodiment is explained in detail below.

As the aluminum-based raw material 2, a pure aluminum-based plate material of JIS (Japanese Industrial Standards)-1050 from which colorless clear anodized film 3 could be easily obtained was used. First, the aluminum-based raw material 2 was cut according to a size of a cover of a cellular phone, and an outer peripheral edge was bent (step S101).

Next, a portion of the aluminum-based raw material 2 to be an outer surface when it was used as a cover was buffed, and the aluminum-based member 1 was cleaned using alkaline cleaner (step S102).

In the anodic oxidation step (step S103), the aluminum-based member 1 was soaked in a solution of 15% sulfuric acid whose temperature was maintained at 20° C., direct current of 100 to 130 $A/m^2$ and bath voltage of 15 V were applied using a lead electrode as a counter electrode. With this process, 10 μm of the anodized film 3 was formed.

In the first coloring step (step S104), the entire aluminum-based member 1 was soaked in a solution having stannous sulfate ($SnSO_4$) as main agent. Alternating current was applied using the aluminum-based member 1 as anode and using the counter electrode as the lead electrode. Tin was deposited on the entire bottom of the holes 33 of the portion to be the outer surface when it was used as the cover, and the first colored layer 42 was formed. As a result, the entire portion to be the outer surface became bronze color. The aluminum-based member 1 taken out from the bath was dried (step S105), and the second coloring step (step S106) was performed subsequently.

Dyeing liquid obtained by diluting the organic dyestuff 61 by a diluent was accommodated in the spray gun 53. The organic dyestuff 61 including 30% by weight of black dye, 60% by weight of ethylene glycol monobutyl ether, and 10% by weight of ethylene glycol monophenyl ether was used. A diluent including 50% by weight of ethylene glycol monobutyl ether and 50% by weight of acetone was used. The organic dyestuff 61 and the diluent were mixed at a ratio of 1 to 5.

The dyeing liquid was sprayed toward the lower end of the aluminum-based member 1 from the spray gun 53 while slowly conveying the aluminum-based member 1 by the conveying device 52 under control of the computer 57. The conveying speed of the aluminum-based member 1 and the spraying amount of the dyeing liquid were controlled such that about ⅓ of the lower side of the aluminum-based member 1 was covered with the black dye. The deliveries of the black organic dyestuff were gradually reduced in the upper side higher than the portion covered with the black dye. Accordingly, the gradation region 65 where black color was gradually changed to bronze color was formed.

Thereafter, the member was washed with water, excessive black organic dyestuff 61 remained on the surface was washed out, the member was heated and dried, and the black organic dyestuff 61 in the holes 33 was fixed (step S107). The aluminum-based member 1 was then soaked in a solution in which nickel acetate was dissolved in water of 85° C., and the closing step was performed (step S108). A cover of a cellular phone having a bronze base color (the first colored layer 42), a black additional color (the second colored layer 62) and the gradation region 65 where the color was gradually changed from black to bronze on a metal texture of the aluminum-based raw material 2 was produced.

Although the gradation region 65 was formed on a flat portion in this example, the gradation region 65 can be formed even after the aluminum-based raw material is formed three dimensionally. This is because, when the second colored layer 62 is formed by the spray gun 53, the gradation region 65 can be formed at the same time.

The present invention is not limited to the above embodiment, and can be widely applied.

For example, three or more colors can be used for the colored layers. The gradation layer can be formed only when a third colored layer is formed, or the gradation can be formed using any one or more layers.

When forming the gradation layer, the gradation layer can be formed without inclining the nozzle 53A almost at all by locating the nozzle 53A at a position far from the aluminum-based member 2. The same applies when the nozzle has such a shape that an organic dyestuff sprayed from the nozzle 53A is easily diffused.

The first color forming material and the second color forming material can be a material of the same color. This is effective when a wave shape gradation is formed.

The entire content of a Patent Application No. TOKUGAN 2007-340217 with a filing date of Dec. 25, 2007 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An aluminum-based member comprising:

a first colored layer formed by holding a first color forming material in a hole of an anodized film constituting an aluminum-based member to dye a first region of the aluminum-based member, a second colored layer formed by diagonally spraying a second color forming material that is different from the first color forming material from the first colored layer, and holding the second color forming material, the second colored layer being formed in a second region that is smaller than the first region, and a gradation region from the second color to the first color in a boundary with respect to a portion where the first region is exposed at an edge of the second region, and is formed when the second colored layer is formed.

2. The aluminum-based member according to claim 1, wherein in the gradation region, an amount of the first color forming material is substantially equal to the first and second colored layers, and an amount of the second color forming material is smaller as a distance from the second colored layer is greater.

3. The aluminum-based member according to claim 1, wherein the gradation region has a wave form.

4. The aluminum-based member according to claim 1, wherein the gradation region has a annularly form.

* * * * *